United States Patent Office 3,497,788
Patented Feb. 24, 1970

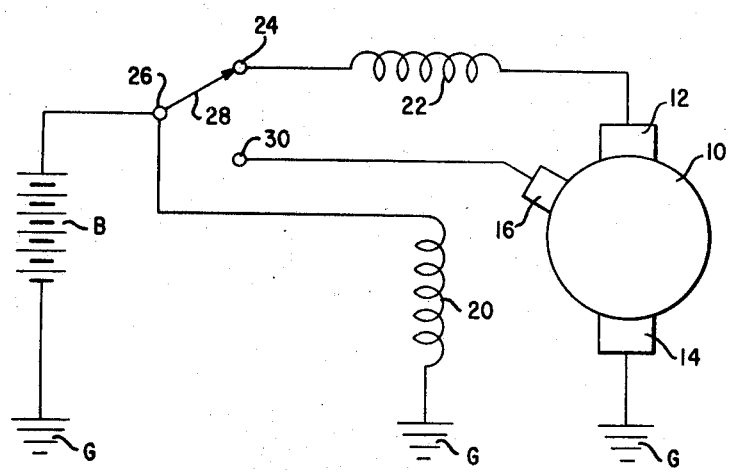
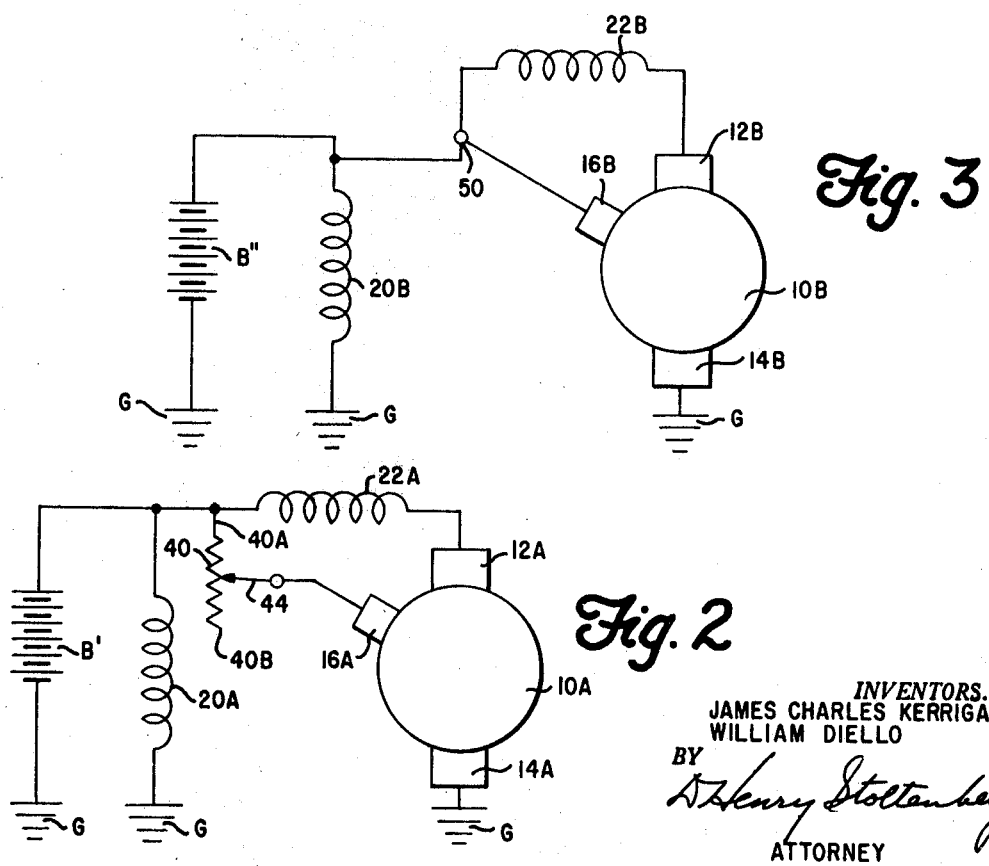

3,497,788
VARIABLE SPEED D.C. MOTOR WITH THIRD BRUSH
James Charles Kerrigan, Milwaukee, Wis., and William Diello, Syracuse, N.Y., assignors to Eltra Corporation, Toledo, Ohio
Filed Feb. 24, 1967, Ser. No. 618,449
Int. Cl. H02p 7/06
U.S. Cl. 318—351                    4 Claims

ABSTRACT OF THE DISCLOSURE

The speed of a D.C. motor is controlled by reducing the number of effective turns on the armature by the use of a third brush positioned between the main brushes.

This invention relates to speed controls for direct-current electric motors, more particularly to small direct-current motors provided with a third-brush construction including wound-field coils in series and shunt relation to a rotating armature.

In the past, many attempts have been made to efficiently control the speed of shunt-wound direct-current motors which usually involved a variable resistor in the field circuit of the motor. The use of a variable resistance in this position controlled the flow of current to the shunt field and resulted in the loss of flux to decrease the motor efficiency, particularly, in the top half of the performance range. The use of thermionic control devices have also been suggested for this purpose, but it was found to be too cumbersome and expensive to make it feasible from the commercial angle. The motor speed was also controlled by the use of a shifting brush arrangement which changed the magnetic relations of the armature with reference to the field to control the speed, but this, again was found impracticable due to the intricacies of the mechanism which often resulted in the failure of the movable brush rigging.

The present invention contemplates the provision of a speed control for small motors particularly useful in connection with windshield wiper motors which utilizes a third brush in combination with a shunt and a series field winding, the relations of which are varied to control the flow of current from an energy source through the armature to control the speed of the motor. The flow of current from an energy source to the third brush and the series field may also be controlled by a rheostatic device to give a gradual control of the motor speeds rather than by steps.

It is, therefore, a principal object of this invention to provide high, low speed control for direct-current motors which utilizes three brushes cooperating with the commutator of the armature, including a series-wound field connected in circuit with the main brushes, whereby the speed of the motor can be controlled and at the same time the performance of the motor at the high-speed end of its performance curve is improved.

It is a further object of this invention to provide a speed control for direct-current motors which improves the efficiency of the motor, particularly, at the top half of its performance range thereby improving the overall efficiency of the motor when under operating conditions.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

FIG. 1 is a schematic diagram of connections applying the invention to a motor having three brushes utilizing both a shunt field and a series field where a switch is incorporated in the circuit and movable to two positions to control the speed of the motor.

FIG. 2 is a schematic diagram of connections of a motor similar to FIG. 1 except that a variable rheostatic device is incorporated which enables the speed of the motor to be controlled over a range, and;

FIG. 3 is a schematic diagram of connections similar to FIG. 1 showing the series field of the motor connected directly to the third brush and the shunt field.

Referring to FIG. 1 of the drawings, a conventional armature 10 is shown having a pair of conventional brushes 12 and 14 cooperating with a conventional commutator in diametrically disposed relation with reference to each other and a third brush 16 located in a predetermined angular relation with reference to the main brushes 12 and 14. A shunt field 20 is provided which has one side grounded at G, being connected directly across the source of energy B such as a battery which has its one side grounded at G in the well-known manner. The lower main brush 14 of the armature 10 is also grounded at G as shown. The upper brush 12 is connected to a series field 22 which is also in circuit with a fixed contact 24 of a manual control switch 26 which controls the speed of the motor by having its movable contact arm 28 adjusted to close the electrical circuit with the contact 24 or with a second fixed contact 30 which is in circuit with the third brush 16.

The source of energy B provides the electrical energy to operate the motor which for the low speed operation is connected with the movable contact arm 28 of the manual switch 26 in circuit with the contact 24 so that the current from the source of energy will flow through a series field 22 to the upper brush 12 through the armature to the lower brush 14 and thence to ground, completing the circuit to the source of energy B. The magnetic field for the motor is supplied by the wound shunt field coil 20. The magnetic field is modified by the series field coil 22 in a cumulative relation particularly at the top half of the performance range of the motor.

When the operator desires to operate the motor at its high-speed range, the movable contact arm 28 of the manual switch is moved to the fixed contact 30 which energizes the armature 10 through the third brush 16, thence through the lower main brush 14 to ground to complete the circuit to the source of energy. In this situation, the effective armature turns are reduced so that the back E.M.F. of the armature is reduced with the result that the speed of the motor will increase substantially.

Referring to the modification shown in FIG. 2, a conventional armature 10A is again provided having upper and lower main brushes 12A and 14A, the lower of which is grounded as shown and is also provided with a third brush 16A which is displaced a predetermined angle on the commutator to control the electrical relations of the motor. The upper brush 12A is in circuit with a series field 22A which is connected with the upper end 40A of a resistance 40, the opposite end 40B of which is connected to the third brush 16A. The resistance is provided with a slidable arm 44 which is in circuit with the source of energy B' and the main shunt field 20A as shown, both being grounded in the well-known manner at G. The shunt field 20A is thereby connected again directly across the source of energy of battery B' as shown. The movable contact arm 44 is capable of being manually adjusted along the resistance between the points 40A and 40B to control the current flow from the source of energy to either the upper main brush 12A or the third brush 16A to thereby control the electrical relations in the armature to give a variable speed-control as the movable contact arm 44 is moved across the resistance between the points 40A and 40B. If desirable, the conformation of the card on which the resistance is wound can be formed in such a manner that the resistance is applied to the electrical circuit in a manner to give a uniform speed-control when the movable contact 44 is manually moved from the point 40A to the point 40B.

When the movable contact arm 44 is adjacent the point 40B, the speed of the motor will be at its lowest point and if it is moved toward the point 40A, the speed of the motor gradually increases and becomes a maximum when it is adjacent to the point 40A. The components of the electrical circuit between the upper main brush 12A and the third brush 16A including the series field 22A and the resistance between the points 40A and 40B can be so designed that the current flowing through the series field 22A may reverse during the movement of the slidable contact arm between the points 40B and 40A on the resistance. This reversal is particularly desirable in the top half of the performance range of the motor in that the effective magnetic field flux may be increased by causing the series field 22A to become cumulative so that torque of the motor is improved in this portion of its performance range.

In the same manner, an automatic speed-control with reference to voltage variation can be incorporated in the motor design by varying the electrical relations of the series field 22A, the resistance 40 and the position of the third brush 16A to cause the current to reverse its flow in the series field 22A at any desirable point in its performance range. These characteristics can be designed into a motor of this kind without substantially changing the efficiency characteristics of the motor.

In the modification shown in FIG. 3, a conventional armature 10B is shown having main brushes 12B and 14B and also a third brush 16B in the manner already described with the first two modifications. The series field 22B in this case is directly connected to a common point 50 which is also in circuit with the third brush 16B, the shunt field 20B and the source of energy B''. The main brush 14B, the shunt field 20B and the source of energy B'' are all grounded at G as described hereinbefore with the other modifications. The electrical connections of this modification of the motor can be designed by adjusting the relative phasing of the brushes and the series field resistance so as to control the current flow through the series field in such a manner to give a cumulative field effect due to the higher and lower back E.M.F. created by the armature under different load and speed conditions. As the load is increased on the motor, the armature back E.M.F. at the brush 12B decreases with a resulting reversal in the current circulating through the series field so that the series field becomes cumulative with the shunt field to increase the flux density of the field thereby increasing the torque in that portion of the performance range of the motor.

In a similar manner, the relative phasing of the elements of the circuit in this modification of the motor can be designed to give a compensating speed characteristic to the motor with voltage variations of the source of energy B''. This becomes possible because the series field 22B will become cumulative at lower loads as compared with its action at higher voltages of the source of energy B'' which may be explained as being the result of the comparative relation of the back E.M.F. of the armature 10B as compared with the potential of the source of energy B''.

This type of construction also has the advantage that the arrangements of the circuit can be varied to reduce the commutating noises at the third brush 16B which can be brought about by varying the series field inductance to offset the inductance on the coil being commutated. In a similar manner, the arcing at the brushes can be reduced by varying the circulating current in the circuits of the armature. The same result can also be attained by changing the number of turns in the series field 22B to shift the commutating zone of the brushes to the most desirable position.

It is to be understood that the above-detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a D.C. motor having a magnetic field circuit excited by shunt and series field coils and an armature cooperating therewith provided with a commutator, a pair of main brushes, diametrically disposed and contacting the commutator with the series field of the motor for operating the motor at a relatively low speed, a third brush contacting the commutator at a position between the first two brushes in circuit with a first of said main brushes for operating the motor at a relatively high speed, a source of electrical energy for the motor, the shunt field being connected in circuit across the source of energy, and switch means to connect the source of energy to the third brush only for operating the motor at high speed, and in a second position to connect the series field and the second main brush to the source of energy to operate the motor at low speed.

2. In a D.C. motor having a magnetic field circuit excited by shunt and series field coils and an armature cooperating therewith provided with a commutator, a pair of main brushes diametrically disposed and contacting the commutator with the series field of the motor for operating the motor at a relatively low speed, a third brush contacting the commutator at a position between the first two brushes in circuit with a first of said main brushes for operating the motor at a relatively high speed, a source of electrical energy for the motor, the shunt field being connected in circuit across the source of energy, and rheostatic means having a sliding contact with a resistance connected in series with the third brush, the source of energy being connected to the sliding contact of the rheostatic means to vary the current flowing to the third brush to operate the motor at varying speed.

3. In a D.C. motor having a magnetic field circuit excited by shunt and series field coils and an armature cooperating therewith provided with a commutator, a pair of main brushes diametrically disposed and contacting the commutator in circuit with the series field for operating the motor, a source of electrical energy for the motor, means for connecting the shunt field across the source of electrical energy, and a third brush contacting the commutator at a position between the first two brushes in circuit with a common point connected to the source of energy and the series and shunt fields.

4. The motor defined in claim 3 further characterized by selecting a predetermined resistive relation in the circuits of the motor and a position of the third brush with reference to the main brush whereby when the load increases to heavy load conditions, the back E.M.F. of the armature causes the flow of current through the series field to reverse.

References Cited

UNITED STATES PATENTS

| 2,144,575 | 1/1939 | Murphy | 318—390 |
| 3,252,068 | 5/1966 | Pasculle | 318—252 |
| 3,310,722 | 3/1967 | Diello | 318—361 |

ORIS L. RADER, Primary Examiner

L. L. HEWITT, Assistant Examiner

U.S. Cl. XR

318—361, 541